United States Patent
Steinhauser

(10) Patent No.: US 9,475,902 B2
(45) Date of Patent: Oct. 25, 2016

(54) TRIALKYLSILYLOXY-TERMINATED POLYMERS

(75) Inventor: Norbert Steinhauser, Dormagen (DE)

(73) Assignee: ARLANXEO Deutschland GmbH, Dormagen (DE)

( * ) Notice: Subject to any disclaimer, the term of this patent is extended or adjusted under 35 U.S.C. 154(b) by 780 days.

(21) Appl. No.: 13/885,220

(22) PCT Filed: Nov. 11, 2011

(86) PCT No.: PCT/EP2011/069910
§ 371 (c)(1),
(2), (4) Date: Jul. 12, 2013

(87) PCT Pub. No.: WO2012/065907
PCT Pub. Date: May 24, 2012

(65) Prior Publication Data
US 2013/0280458 A1    Oct. 24, 2013

(30) Foreign Application Priority Data

Nov. 16, 2010  (EP) .................................. 10191344

(51) Int. Cl.
| | |
|---|---|
| *C08L 101/10* | (2006.01) |
| *C08F 236/10* | (2006.01) |
| *C08L 83/04* | (2006.01) |
| *B60C 1/00* | (2006.01) |
| *C08C 19/44* | (2006.01) |
| *C08L 15/00* | (2006.01) |

(52) U.S. Cl.
CPC ........... *C08F 236/10* (2013.01); *B60C 1/0016* (2013.04); *C08C 19/44* (2013.01); *C08L 15/00* (2013.01); *C08L 83/04* (2013.01); *C08L 101/10* (2013.01); *Y10T 428/1386* (2015.01)

(58) Field of Classification Search
CPC ..... C08C 19/25; C08C 19/44; C08L 101/10; C08L 83/04; C08L 15/00
See application file for complete search history.

(56) References Cited

U.S. PATENT DOCUMENTS

| | | |
|---|---|---|
| 3,244,664 A | 4/1966 | Zelinski et al. |
| 4,185,042 A | 1/1980 | Verkouw |
| 4,417,029 A | 11/1983 | Milkovich |
| 4,616,069 A | 10/1986 | Watanabe et al. |
| 5,659,056 A | 8/1997 | Hergenrother et al. |
| 5,965,681 A | 10/1999 | Schwindeman et al. |
| 6,255,404 B1 | 7/2001 | Hogan et al. |
| 6,279,632 B1 | 8/2001 | Hogan et al. |
| 6,333,375 B1 | 12/2001 | Nakamura et al. |
| 6,790,889 B2 | 9/2004 | Hergenrother et al. |
| 7,528,199 B2 | 5/2009 | Taniguchi et al. |
| 2005/0075463 A1 | 4/2005 | Zamoch et al. |

OTHER PUBLICATIONS

Porri et al., "Conjugated Diene Polymerization", Comprehensive Polymer Science, vol. 4, Chain Polymerization II, 1989, Pergamon Press, Oxford et al., pp. 53-108.
I. Franta, "Elastomers and Rubber Compounding Materials", Studies in Polymer Science, 1, 1989, Elsevier, Amsterdam et al., pp. 113-130.
Tohyama et al., "Synthesis of end-functionalized polymer by means of living anionic polymerization . . . ", Macromol. Chem., Phys. 197, 1996, Huethig & Wepf, Verlag, Zug, pp. 3135-3148.
Hahn et al., "Organosiliciumperoxyde als Initiatoren", Makromol. Chem., 21: 113-120, 1956, Abstract, available from http://onlinelibrary.wiley.com.
Camici et al., "Synthesis of Trimethylsilyloxy and Hydroxy Compounds from Carbanions and Bis(trimethylsilyl) peroxide", Tetrahedron, vol. 44 No. 13, 1988, Great Britain, pp. 4197-4206.
International Search Report from International Application PCT/EP2011/069910 dated Apr. 13, 2012, 3 pages.
Prakash et al., "Electrophilic Modification of Polystyrene Nanospheres", Journal of Nanoscience and nanotechnology, vol. 5, 2005, American Scientific Publishers, United States of America, pp. 397-403.

*Primary Examiner* — Margaret Moore

(57) ABSTRACT

The present invention relates to polymers functionalized by terminal groups, where the polymers have a trialkylsilyloxy group of the formula (I)

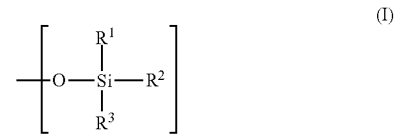

at the end of the chain, where $R^1$, $R^2$, and $R^3$ can be identical or different and are alkyl, cycloalkyl, and aralkyl moieties which can comprise heteroatoms such as O, N, S, and Si.

8 Claims, No Drawings

TRIALKYLSILYLOXY-TERMINATED POLYMERS

The invention relates to polymers functionalized by terminal groups, and to the production and use of the said polymers.

Important desirable properties in tyre treads are good adhesion to a dry and a wet surface, low rolling resistance and also high abrasion resistance, but it is very difficult to improve the skid resistance of a tyre without simultaneously impairing rolling resistance and abrasion resistance. Low rolling resistance is important for low fuel consumption, and high abrasion resistance is the decisive factor for high tyre lifetime.

The wet skid resistance and rolling resistance of a tyre tread are highly dependent on the dynamic mechanical properties of the rubbers used in producing the mixture. Rubbers with high rebound resilience at relatively high temperatures (60° C. to 100° C.) are used for the tyre tread in order to lower rolling resistance. On the other hand, rubbers with a high damping factor at low temperatures (0° to 23° C.) and, respectively, with low rebound resilience in the range from 0° C. to 23° C. are advantageous for improving wet skid resistance. In order to comply with this complex combination of requirements, the tyre tread uses mixtures made of various rubbers. The mixtures usually used are made of one or more rubbers with relatively high glass transition temperature, e.g. styrene-butadiene rubber, and of one or more rubbers with relatively low glass transition temperature, e.g. polybutadiene having high 1,4-cis content or a styrene-butadiene rubber having low styrene content and low vinyl content or a polybutadiene produced in solution having moderate 1,4-cis content and low vinyl content.

Anionically polymerized solution rubbers containing double bonds, e.g. solution polybutadiene and solution styrene-butadiene rubbers, have advantages over corresponding emulsion rubbers for producing tyre treads with low rolling resistance. The advantages consist inter alia in controllability of vinyl content and the glass transition temperature and molecular branching associated therewith. This leads to particular practical advantages in the relationship between wet skid resistance and rolling resistance of the tyre. Significant contributions to energy dissipation, and therefore to rolling resistance in tyre treads, come from free polymer chain ends and from reversible formation and disjunction of the filler network which is formed by the filler (mostly silica and/or carbon black) used in the tyre tread mixture.

Introduction of functional groups at the polymer chain ends permits physical or chemical linkage of the said chain ends to the surface of the filler. This leads to restricted freedom of motion thereof, and therefore to reduced energy dissipation when the tyre tread is subject to dynamic stress. At the same time, the said functional terminal groups can improve the dispersion of the filler in the tyre tread, and this can lead to weakening of the filler network and thus to a further reduction of rolling resistance.

Numerous methods for modifications of terminal groups have therefore been developed. By way of example, EP 0 180 141 A1 describes the use of 4,4'-bis(dimethylamino) benzophenone or N-methylcaprolactam as functionalization reagents. The use of ethylene oxide and N-vinylpyrrolidone is also known from EP 0 864 606 A1. U.S. Pat. No. 4,417,029 lists a number of other possible functionalization reagents.

Silanes which have a total of at least two halogen substituents and/or alkyloxy substituents and/or aryloxy substituents on silicon in particular have good suitability for functionalization of terminal groups of diene rubbers since one of the abovementioned substituents on the Si atom can easily be replaced by an anionic diene polymer chain end, and the other abovementioned substituent(s) on Si is/are available as functional group which, optionally after hydrolysis, can interact with the filler of the tyre tread mixture. Examples of silanes of this type are found in U.S. Pat. No. 3,244,664, U.S. Pat. No. 4,185,042, and EP 0 890 580 A1.

However, many of the abovementioned functionalization reagents have disadvantages, e.g. poor solubility in the process solvent, high toxicity or high volatility, and this can lead to contamination of the returned solvent. Furthermore, many of the said functionalization reagents can react with more than one anionic polymer chain end, and this leads to coupling reactions which are often disruptive and difficult to control. This is especially true for the abovementioned silanes. These also have the further disadvantage that reaction of the said silanes with the anionic polymer chain end involves cleavage of components such as halides or alkoxy groups, and the latter are easily converted to alcohols. Halides promote corrosion; alcohols can lead to contamination of the process solvent. A further disadvantage in the use of silanes as functionalization reagents is that, after the functionalization process, the resultant siloxane-terminated polymers can couple by way of the Si—OR groups at the polymer chain ends (or by way of the Si—OH groups after hydrolysis of the Si—OR groups) with formation of Si—O—Si bonds, and this leads to an undesired increase in the viscosity of the rubbers during work-up and storage. Many methods have been described for reducing the said viscosity increase in siloxane-terminated polymers, examples being addition of stabilizing reagents based on acid and acyl halides (EP 0 801 078 A1), addition of siloxane (EP 1 198 506 B1), addition of long chain alcohols (EP 1 237 934 B1) and addition of reagents for pH control (EP 1 726 598).

An advantage of hydroxy-terminated polymers, in which the bond is between the OH group and C rather than Si, is that the coupling reaction described above, forming Si—O—Si bonds, does not occur. There are various methods described for introducing these C-bonded OH groups, e.g. use of ethylene oxide as functionalization reagent. However, ethylene oxide has the disadvantage of high volatility and high toxicity. Other methods, such as use of ketones, have the disadvantage that numerous side reactions can proceed alongside the desired reaction to give the hydroxy-terminated polymer. In contrast, tert-butyldimethylsilyl ethers of ω-halo-1-alkanols, such as 3-(tert-butyldimethylsilyloxy)-1-chloropropane, react quantitatively with the anionic polymer chain ends of polydienes and polyvinyl aromatics (described by way of example in U.S. Pat. No. 5,965,681, and also in M. Tohyama, A. Hirao, S, Nakahama, *Macromol. Chem. Phys.* 1996, 197, 3135-3148) with substitution of the halogen atom. The corresponding tert-butyldimethylsilyloxy-terminated polymers can be reacted in a subsequent hydrolysis step to give hydroxy-terminated polymers. A disadvantage with this type of functionalization is that the tert-butyldimethylsilyl group exhibits a high level of steric shielding, and hydrolysis of the tert-butyldimethylsilyloxy group to give the OH group therefore requires drastic conditions, such as long reaction times and low pH. Protective groups, such as trimethylsilyl, which exhibit a lower level of steric shielding and permit easier hydrolysis cannot be used for this type of functionalization, since the lower level of steric shielding leads to attack of the anionic polymer chain ends on Si.

An object was therefore to provide polymers which are functionalized by terminal groups and which do not have the disadvantages of the prior art.

The said object is achieved by proposing polymers which are functionalized by terminal groups, and which have a trialkylsilyloxy group of the formula (I)

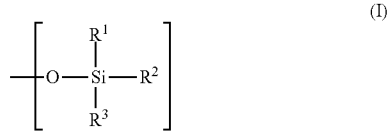

at the end of the polymer chain, where $R^1$, $R^2$, and $R^3$ can be identical or different and are alkyl, cycloalkyl, and aralkyl moieties which can comprise heteroatoms such as O, N, S, and Si.

It is preferable that all of the moieties R are identical and are composed of n-alkyl substituents, particular preference being given to methyl groups.

It is preferable that the polymers according to the invention functionalized by terminal groups have terminal hydroxy groups (terminal OH groups), where these are produced via hydrolysis of the polymers according to the invention functionalized by terminal groups and having terminal groups according to formula (I).

Preferred polymers for producing the polymers according to the invention functionalized by terminal groups are diene polymers and diene copolymers obtainable via copolymerization of dienes with vinylaromatic monomers.

Dienes used are preferably 1,3-butadiene, isoprene, 1,3-pentadiene, 2,3-dimethylbutadiene, 1-phenyl-1,3-butadiene and/or 1,3-hexadiene. It is particularly preferable to use 1,3-butadiene and/or isoprene.

Examples of vinylaromatic comonomers that can be used are styrene, o-, m- and/or p-methylstyrene, p-tert-butylstyrene, α-methylstyrene, vinylnaphthalene, divinylbenzene, trivinylbenzene and/or divinylnaphthalene. It is particularly preferable to use styrene.

The said polymers are preferably produced via anionic solution polymerization or via polymerization by means of coordination catalysts. In this context, coordination catalysts are Ziegler-Natta catalysts or monometallic catalyst systems. Preferred coordination catalysts are those based on Ni, Co, Ti, Zr, Nd, V, Cr, Mo, W or Fe.

Initiators for the anionic solution polymerization process are those based on alkali metal or on alkaline earth metal, e.g. methyllithium, ethyllithium, isopropyllithium, n-butyllithium, sec-butyllithium, pentyllithium, n-hexyllithium, cyclohexyllithium, octyllithium, decyllithium, 2-(6-lithio-n-hexoxy)tetrahydropyran, 3-(tert-butyldimethylsiloxy)-1-propyllithium, phenyllithium, 4-butylphenyllithium, 1-naphthyllithium, p-toluyllithium, lithium amides of secondary amines, e.g. lithium pyrrolidide, lithium piperidide, lithium hexamethylenemide, lithium diphenylamide. These lithium amides can also be produced in situ via reaction of an organolithium compound with secondary amines. It is also possible to use di- and polyfunctional organolithium compounds, e.g. 1,4-dilithiobutane, and dilithium piperazide. It is preferable to use n-butyllithium and sec-butyllithium.

It is also possible to use the known randomizers and control agents for the microstructure of the polymer, e.g. diethyl ether, di-n-propyl ether, diisopropyl ether, di-n-butyl ether, ethylene glycol dimethyl ether, ethylene glycol diethyl ether, ethylene glycol di-n-butyl ether, ethylene glycol di-tert-butyl ether, diethylene glycol dimethyl ether, diethylene glycol diethyl ether, diethylene glycol di-n-butyl ether, diethylene glycol di-tert-butyl ether, 2-(2-ethoxyethoxy)-2-methylpropane, triethylene glycol dimethyl ether, tetrahydrofuran, ethyl tetrahydrofurfuryl ether, hexyl tetrahydrofurfuryl ether, 2,2-bis(2-tetrahydrofuryl)propane, dioxane, trimethylamine, triethylamine, N,N,N',N'-tetramethylethylenediamine, N-methylmorpholine, N-ethylmorpholine, 1,2-dipiperidinoethane, 1,2-dipyrrolidinoethane, 1,2-dimorpholinoethane, and also the potassium and sodium salts of alcohols, of phenols, of carboxylic acids and of sulphonic acids.

Solution polymerization processes of this type are known and are described by way of example in I. Franta, Elastomers and Rubber Compounding Materials; Elsevier 1989, pp. 113-131, in Houben-Weyl, Methoden der Organischen Chemie [Methods of Organic Chemistry], Thieme Verlag, Stuttgart, 1961, Volume XIV/1, pp. 645 to 673 or Volume E 20 (1987), pp. 114 to 134 and pp. 134 to 153, and also in Comprehensive Polymer Science, Vol. 4, Part II (Pergamon Press Ltd., Oxford 1989), pp. 53-108.

The preferred dienehomo- and copolymers are preferably produced in a solvent. Preferred solvents used for the polymerization process are inert aprotic solvents, e.g., paraffinic hydrocarbons, such as isomeric butanes, pentanes, hexanes, heptanes, octanes and decanes, cyclopentane, cyclohexane, methylcyclohexane, ethylcyclohexane or 1,4-dimethylcyclohexane, or aromatic hydrocarbons, such as benzene, toluene, ethylbenzene, xylene, diethylbenzene or propylbenzene. These solvents can be used individually or in combination. Preference is given to cyclohexane and n-hexane. Blending with polar solvents is likewise possible.

The amount of solvent for the process according to the invention is usually from 100 to 1000 g, preferably from 200 to 700 g, based on 100 g of the entire amount of monomer used. However, it is also possible to polymerize the monomers used in the absence of solvents.

In a possible method for conducting the polymerization process, the monomers and the solvent are used as initial charge, and the polymerization process is then initiated via addition of the initiator or catalyst. It is also possible to polymerize the materials in a feed process in which monomers and solvent are added to the polymerization reactor, where the initiator or catalyst is used as initial charge or is added with the monomers and the solvent. There are possible variations, for example use of the solvent as initial charge in the reactor, addition of the initiator or catalyst and then addition of the monomers. It is also possible to operate the polymerization process continuously. In all cases, it is possible to add further monomer and solvent during, or at the end of, the polymerization process.

The polymerization time can vary widely from a few minutes to some hours. The polymerization time is usually about 10 minutes up to 8 hours, preferably from 20 minutes to 4 hours. The polymerization process can be conducted either at atmospheric pressure or else at elevated pressure (from 1 to 10 bar).

Surprisingly it has been found that the use of one or more bis(trialkylsilyl) peroxides as functionalization reagents can produce polymers which are functionalized by terminal groups and which do not have the disadvantages of the prior art. In particular, this method can introduce, at the polymer chain end, trialkylsilyloxy groups, which are attended by a low level of steric shielding and which are easy to hydrolyse, an example being trimethylsilyloxy.

The bis(trialkylsilyl) peroxides are compounds of the general formula (II)

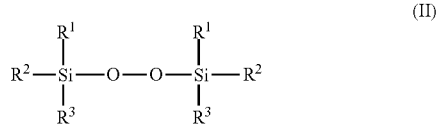

(II)

where
R$^1$, R$^2$, and R$^3$ can be identical or different and are alkyl, cycloalkyl, and aralkyl moieties which can comprise heteroatoms such as O, N, S, and Si.

It is preferable that all of the moieties R are identical and are composed of n-alkyl substituents, particular preference being given to methyl.

The invention therefore also provides the use of bis (trialkylsilyl) peroxides as functionalization reagents for producing the polymers according to the invention which are functionalized by terminal groups and which have terminal groups of the formula (I) or which have terminal hydroxy groups.

The average (number average) molar masses of the polymers according to the invention are preferably from 10 000 to 2 000 000 g/mol, preferably from 100 000 to 1 000 000 g/mol, their glass transition temperatures being from −110° C. to +20° C., preferably from −110° C. to 0° C., and their Mooney viscosities [ML 1+4 (100° C.)] being from 10 to 200 Mooney units, preferably from 30 to 150 Mooney units.

The invention further provides a process for producing the polymers according to the invention functionalized by terminal groups, where one or more compounds of the formula (II) are added in the form of pure substance, solution or suspension to polymers having reactive polymer chain ends. The addition preferably takes place after conclusion of the polymerization process; however, it can also take place prior to complete monomer conversion. The reaction of compounds of the formula (II) with polymers having reactive polymer chain ends takes place at the temperatures usually used for the polymerization process. The reaction times for the reaction of compounds of the formula (II) with the reactive polymer chain ends can be from a few minutes to a number of hours.

The amount of the said compounds can be selected in such a way that all of the reactive polymer chain ends react with components of the formula (II), or a sub-stoichiometric amount of the said compounds can be used. The amounts used of the compounds according to formula (II) can cover a wide range. The preferred amounts are from 0.005 to 2% by weight, particularly preferably from 0.01 to 1% by weight, based on the amount of polymer.

In addition to compounds according to formula (II) it is also possible to use the coupling reagents that are typically used for the anionic diene-polymerization process, for the reaction with the reactive polymer chain ends. Examples of these coupling reagents are silicon tetrachloride, methyltrichlorosilane, dimethyldichlorosilane, tin tetrachloride, dibutyltin dichloride, tetraalkoxysilanes, ethylene glycol diglycidyl ether and 1,2,4-tris(chloromethyl)benzene. These coupling reagents can be added prior to the compounds of the formula (II), together with these, or after these.

After addition of compounds of the formula (II), and prior to, during or after the work-up of the polymers, a hydrolysis step can take place for the cleavage of the trialkylsilyl groups at the polymer chain ends, whereupon the corresponding hydroxy-terminated polymers are obtained. The cleavage of the trialkylsilyl group can by way of example be achieved via addition of mineral acids or via addition of fluorides to the polymer solution. Further methods are described in T. W. Greene, P. G. M. Wuts, *Protective Groups in Organic Synthesis*, 2$^{nd}$ Edition 1991, Wiley, New York.

After addition of components of the formula (II) and optionally of coupling reagents, the conventional antioxidants, such as sterically hindered phenols, aromatic amines, phosphites, and thioethers, are preferably added prior to or during the work-up of the trialkylsilyloxy-terminated polymers or of the hydroxy terminated polymers. It is also possible to add the conventional extender oils used for diene rubbers, e.g. DAE (Distillate Aromatic Extract) oils, TDAE (Treated Distillate Aromatic Extract) oils, MES (Mild Extraction Solvate) oils, RAE (Residual Aromatic Extract) oils, TRAE (Treated Residual Aromatic Extract) oils, and naphthenic and heavy naphthenic oils. It is also possible to add fillers, such as carbon black and silica, and rubbers and rubber auxiliaries.

The solvent can be removed from the polymerization process by the conventional methods, such as distillation, steam stripping, or application of a vacuum, optionally at elevated temperature.

The invention further provides the use of the polymers according to the invention functionalized by terminal groups, namely the trialkylsilyloxy-terminated polymers according to the invention or the hydroxy-terminated polymers produced therefrom, for producing vulcanizable rubber compositions.

It is preferable that the said vulcanizable rubber compositions comprise further rubbers, fillers, rubber chemicals, processing aids and extender oils.

Examples of additional rubbers are natural rubber and also synthetic rubbers. The amount of these, to the extent that they are present, is usually in the range from 0.5 to 95% by weight, preferably from 10 to 80% by weight, based on the total amount of polymer in the mixture. The amount of rubbers additionally added in turn depends on the respective intended use of the mixtures according to the invention.

A list of synthetic rubbers known from the literature is given here by way of example. They comprise inter alia
BR Polybutadiene
ABR Butadiene/C$_1$-C$_4$-alkyl acrylate copolymers
IR Polyisoprene
ESBR Styrene-butadiene copolymers having from 1-60% by weight styrene contents, preferably from 20-50% by weight, produced via emulsion polymerization
SSBR Styrene-butadiene copolymers having from 1-60% by weight styrene contents, preferably from 15-45% by weight, produced via solution polymerization
IIR Isobutylene-isoprene copolymers
NBR Butadiene-acrylonitrile copolymers having from 5 to 60% by weight acrylonitrile contents, preferably from 10-40% by weight
HNBR Partially hydrogenated or fully hydrogenated NBR rubber
EPDM Ethylene-propylene-diene terpolymers
and also mixtures of the said rubbers. Materials of interest for producing motor vehicle tyres are in particular natural rubber, ESBR and SSBR with glass transition temperature above −60° C., polybutadiene rubber having high cis-content (>90%), which has been produced using catalysts based on Ni, Co, Ti or Nd, and also polybutadiene rubber having up to 80% vinyl content, and also mixtures of these.

Fillers that can be used for the rubber compositions according to the invention are any of the known fillers used in the rubber industry. These comprise active and inert fillers.

Examples that may be mentioned are:

fine-particle silicas, produced by way of example via precipitation from solutions of silicates or via flame hydrolysis of silicon halides with specific surface areas of from 5 to 1000 $m^2/g$ (BET surface area), preferably from 20 to 400 $m^2/g$, and with primary particle sizes of from 10 to 400 nm. The silicas can, if appropriate, also take the form of mixed oxides with other metal oxides, such as oxides of Al, of Mg, of Ca, of Ba, of Zn, of Zr, or of Ti;

synthetic silicates, such as aluminium silicate, or alkaline earth metal silicate, e.g. magnesium silicate or calcium silicate, with BET surface areas of from 20 to 400 $m^2/g$ and with primary particle diameters of from 10 to 400 nm;

natural silicates, such as kaolin and any other naturally occurring form of silica;

glass fibres and glass-fibre products (mats, strands), or glass microbeads;

metal oxides, such as zinc oxide, calcium oxide, magnesium oxide, or aluminium oxide;

metal carbonates, such as magnesium carbonate, calcium carbonate, or zinc carbonate;

metal hydroxides, e.g. aluminium hydroxide or magnesium hydroxide;

metal sulphates, such as calcium sulphate or barium sulphate;

carbon blacks: The carbon blacks for use here are those prepared by the flame process, channel process, furnace process, gas process, thermal process, acetylene process or arc process, their BET surface areas being from 9 to 200 $m^2/g$, e.g. SAF, ISAF-LS, ISAF-HM, ISAF-LM, ISAF-HS, CF, SCF, HAF-LS, HAF, HAF-HS, FF-HS, SPF, XCF, FEF-LS, FEF, FEF-HS, GPF-HS, GPF, APF, SRF-LS, SRF-LM, SRF-HS, SRF-HM and MT carbon blacks, or the following types according to ASTM classification: N110, N219, N220, N231, N234, N242, N294, N326, N327, N330, N332, N339, N347, N351, N356, N358, N375, N472, N539, N550, N568, N650, N660, N754, N762, N765, N774, N787 and N990 carbon blacks;

rubber gels, in particular those based on polybutadiene, styrene-butadiene copolymers and/or polychloroprene with particle sizes from 5 to 1000 nm.

Preferred fillers used are fine-particle silicas and/or carbon blacks.

The fillers mentioned can be used alone or in a mixture. In one particularly preferred embodiment, the rubber compositions comprise, as fillers, a mixture composed of pale-coloured fillers, such as fine-particle silicas, and of carbon blacks, where the mixing ratio of pale-coloured fillers to carbon blacks is from 0.01:1 to 50:1, preferably from 0.05:1 to 20:1.

The amounts used of the fillers here are in the range from 10 to 500 parts by weight based on 100 parts by weight of rubber. It is preferable to use from 20 to 200 parts by weight.

In another embodiment of the invention, the rubber compositions also comprise rubber auxiliaries, which by way of example improve the processing properties of the rubber compositions, or serve for the crosslinking of the rubber compositions, or improve the physical properties of the vulcanizates produced from the rubber compositions of the invention, for the specific intended purpose of the said vulcanizates, or improve the interaction between rubber and filler, or serve for the coupling of the rubber to the filler.

Examples of rubber auxiliaries are crosslinking agents, e.g. sulphur or sulphur-donor compounds, and also reaction accelerators, antioxidants, heat stabilizers, light stabilizers, antiozone agents, processing aids, plasticizers, tackifiers, blowing agents, dyes, pigments, waxes, extenders, organic acids, silanes, retarders, metal oxides, extender oils, e.g. DAE (Distillate Aromatic Extract) oil, TDAE (Treated Distillate Aromatic Extract) oil, MES (Mild Extraction Solvate) oil, RAE (Residual Aromatic Extract) oil, TRAE (Treated Residual Aromatic Extract) oil, and naphthenic and heavy naphthenic oils, and also activators.

The total amount of rubber auxiliaries is in the range from 1 to 300 parts by weight, based on 100 parts by weight of entirety of rubber. It is preferable to use from 5 to 150 parts by weight of rubber auxiliaries.

The invention also provides a process for the production of the rubber compositions of the invention, according to which at least one trialkylsilyloxy-terminated polymer according to the invention, or a hydroxy-terminated polymer produced therefrom, optionally with further rubbers, fillers and rubber auxiliaries, in the amounts mentioned above, is/are mixed in a mixing apparatus at temperatures from 20-220° C.

The vulcanizable rubber compositions can be produced in a single-stage or a multistage process, preference being given to 2 to 3 mixing stages. It is therefore possible by way of example that the addition of sulphur and accelerator takes place in a separate mixing stage, e.g. on a roll, preference being given here to temperatures in the range from 30° C. to 90° C. It is preferable that the addition of sulphur and accelerator takes place in the final mixing stage.

Examples of assemblies suitable for producing the vulcanizable rubber compositions are rolls, kneaders, internal mixers and mixing extruders.

The invention therefore further provides vulcanizable rubber compositions comprising polymers functionalized by terminal groups having terminal groups of the formula (I) or having terminal hydroxy groups produced therefrom.

The invention further provides the use of the vulcanizable rubber compositions according to the invention for producing rubber vulcanizates, especially for producing tyres, in particular tyre treads, where these have particularly low rolling resistance with high wet skid resistance and abrasion resistance.

The vulcanizable rubber compositions according to the invention are also suitable for producing mouldings, e.g. for the production of cable sheathing, hoses, drive belts, conveyer belts, roll coverings, shoe soles, sealing rings and damping elements.

The examples below serve to illustrate the invention, without any resultant limiting effect.

EXAMPLES

Example 1a

Synthesis of Styrene-Butadiene Copolymer
(Comparative Example)

The following were charged to an inertized 20 L reactor: 8.5 kg of hexane, 1125 g of 1,3-butadiene, 375 g of styrene, 28 mmol of 2,2-bis(2-tetrahydrofuryl)propane and also 10 mmol of butyllithium, and the contents were heated to 70°

C. The mixture was polymerized for 1 h at 70° C. with stirring. The rubber solution was then discharged, and stabilized by adding 3 g of Irganox® 1520 (2,4-bis(octylthiomethyl)-6-methylphenol) and the solvent was removed by steam-stripping. The rubber crumb was dried in vacuo at 65° C.

Vinyl content (by IR spectroscopy): 51.5% by weight; styrene content (by IR spectroscopy): 24.7% by weight; glass transition temperature (DSC): −16° C.; number-average molar mass $M_n$ (GPC, PS standard): 242 kg/mol; $M_w/M_n$: 1.30; Mooney viscosity (ML1+4 at 100° C.): 71 MU Example 1b Synthesis of Trialkylsilyloxy-Terminated Styrene-Butadiene Copolymer (According to the Invention)

The following were charged to an inertized 20 L reactor: 8.5 kg of hexane, 1125 g of 1,3-butadiene, 375 g of styrene, 28 mmol of 2,2-bis(2-tetrahydrofuryl)propane and also 10.5 mmol of butyllithium, and the contents were heated to 70° C. The mixture was polymerized for 1 h at 70° C. with stirring. Bis(trimethylsilyl) peroxide (11.6 mmol) (2.07 g) was then added, and the reactor contents were heated to 70° C. for a further 20 mm. The rubber solution was then discharged, and stabilized by adding 3 g of Irganox® 1520 and the solvent was removed by steam-stripping. The rubber crumb was dried in vacuo at 65° C.

Vinyl content (by IR spectroscopy): 51.7% by weight; styrene content (by IR spectroscopy): 24.8% by weight; glass transition temperature (DSC): −14° C.; number-average molar mass $M_n$ (GPC, PS standard): 251 kg/mol; $M_w/M_n$: 1.31; Mooney viscosity (ML1+4 at 100° C.): 77 MU Examples 2a, and b Rubber Compositions Tyre tread rubber compositions were produced which comprise the styrene-butadiene copolymer from Example 1a as comparative example (rubber composition 2a), and also the trialkylsilyloxy-terminated styrene-butadiene copolymer according to the invention from Example 1b (rubber composition 2b). Table 1 lists the constituents. The rubber compositions (without sulphur and accelerator) were produced in a 1.5 L kneader. The sulphur and accelerator constituents were then admixed at 40° C. on a roll.

TABLE 1

Constituents of tyre tread rubber compositions
(data in phr: parts by weight per 100 parts by weight of rubber)

| | Comparative example 2a | Example 2b according to the invention |
|---|---|---|
| Styrene-butadiene copolymer from Example 1a | 70 | 0 |
| Trialkylsilyloxy-terminated styrene-butadiene copolymer from Example 1b | 0 | 70 |
| High-cis-content polybutadiene (BUNA ™ CB 24 from Lanxess Deutschland GmbH) | 30 | 30 |
| Silica (Ultrasil® 7000) | 90 | 90 |
| Carbon black (Vulcan® J/N 375) | 7 | 7 |

TABLE 1-continued

Constituents of tyre tread rubber compositions
(data in phr: parts by weight per 100 parts by weight of rubber)

| | Comparative example 2a | Example 2b according to the invention |
|---|---|---|
| TDAE oil (Vivatec 500) | 36.3 | 36.3 |
| Processing aid (Aflux 37) | 3 | 3 |
| Stearic acid (Edenor C 18 98-100) | 1 | 1 |
| Antioxidant (Vulkanox ® 4020/LG from Lanxess Deutschland GmbH) | 2 | 2 |
| Antioxidant (Vulkanox ® HS/LG from Lanxess Deutschland GmbH) | 2 | 2 |
| Zinc oxide (Rotsiegel zinc white) | 2 | 2 |
| Wax (Antilux 654) | 2 | 2 |
| Silane (Si 69 ® von Evonik) | 7.2 | 7.2 |
| Diphenylguanidine (Vulkacit ® D/C from Lanxess Deutschland GmbH) | 2.2 | 2.2 |
| Sulphenamide (Vulkacit ® NZ/EGC from Lanxess Deutschland GmbH) | 1.6 | 1.6 |
| Sulphur (90/95 ground sulphur, Chancel) | 1.6 | 1.6 |
| Sulphonamide (Vulkalent ® E/C) | 0.2 | 0.2 |

Examples 3a, and b

Vulcanizate Properties

The tyre tread rubber compositions of Examples 2a and 2b in Table 1 were vulcanized at 160° C. for 20 minutes. The properties of the corresponding vulcanizates are listed as Examples 3a and 3b in Table 2.

TABLE 2

Vulcanizate properties

| | Comparative example 3a | Example 3b according to the invention |
|---|---|---|
| Styrene-butadiene copolymer in vulcanizate: | | |
| Styrene-butadiene copolymer from Example 1a | X | |
| Trialkyisilyloxy-terminated styrene-butadiene copolymer from Example 1b | | X |
| Vulcanizate properties: | | |
| Rebound resilience at 23° C. [%] | 28 | 30.5 |
| Rebound resilience at 60° C. [%] | 50.5 | 53.5 |
| tan δ maximum (MTS amplitude sweep at 1 Hz, 60° C.) | 0.193 | 0.177 |
| tan δ at 0° C. (dynamic damping at 10 Hz) | 0.291 | 0.321 |
| tan δ at 60° C. (dynamic damping at 10 Hz) | 0.120 | 0.105 |
| Elongation at break (S2 test specimen) [%] | 428 | 448 |
| Tensile stress at break (S2 test specimen) [MPa] | 18.3 | 20.1 |
| Abrasion (DIN 53516) [mm³] | 95 | 86 |

Tyre applications need low rolling resistance, and this is present if the values measured in the vulcanizate are high for rebound resilience at 60° C. and low for tan δ in dynamic damping at high temperature (60° C.) and low for tan δ maximum in the amplitude sweep. As can be seen in Table 2, the vulcanizate of Example 3b according to the invention features high rebound resilience at 60° C., low tan δ in dynamic damping at 60° C. and low tan δ maximum in the amplitude sweep.

Tyre applications also need high wet skid resistance and this is present when the vulcanizate has a high tan δ value in dynamic damping at low temperature (0° C.). As can be seen in Table 2, the vulcanizate of Example 3b according to the invention features a high tan δ value in dynamic damping at 0° C.

Tyre applications also need high abrasion resistance. As can be seen from Table 2, the vulcanizate of Example 3b according to the invention features low DIN abrasion.

The invention claimed is:

1. A process for producing polymers functionalized by terminal groups, the process comprising contacting polymers having reactive chain ends with functionalization reagent comprising one or more bis(trialkylsilyl) peroxides to produce polymers comprising terminal trialkylsilyloxy groups.

2. The process according to claim 1, further comprising contacting the polymers having reactive chain ends with the functionalization reagent after conclusion of polymerization of the polymers.

3. The process according to claim 1, further comprising contacting the polymers having reactive chain ends with an excess amount of functionalization reagent.

4. The process according to claim 1, further comprising contacting the polymers having reactive chain ends with a stoichiometric amount or a sub-stoichiometric amount of functionalization reagent.

5. The process to claim 2, 3 or 4, wherein the amount of functionalization reagents is 0.005-2% by weight based on the amount of polymer having reactive polymer than ends.

6. The process according to claim 5, further comprising contacting the polymers having reactive chain ends with functionalization reagent in the presence of coupling reagents.

7. The process according to claim 1, wherein the process comprises contacting the polymers having reactive chain ends with bis(trialkylsilyl) peroxide of the formula (II)

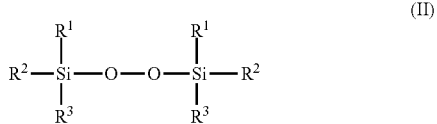

(II)

to produce polymers comprising terminal trialkylsilyloxy groups of the formula (I)

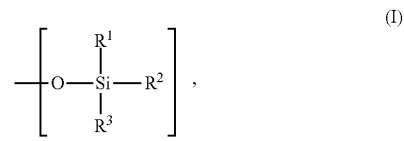

(I)

where $R^1$, $R^2$, and $R^3$ are identical or different and are alkyl, cycloalkyl, and aralkyl moieties which can comprise heteroatoms such as O, N, S, and Si.

8. The process according to claim 7, wherein:

$R^1$, $R^2$ and $R^3$ are identical and are methyl;

the polymer is a polybutadiene, a polyisoprene, a butadiene-isoprene copolymer, a butadiene-styrene copolymer, an isoprene-styrene copolymer, or a butadiene-isoprene-styrene terpolymer; and the process further comprises polymerization of the polymers, and after conclusion of polymerization, contacting of the polymers having reactive chain ends with the functionalization reagent in the presence of a coupling agent; and an amount of functionalization reagent is 0.01-1% by weight, based on the amount of polymer having reactive polymer chain ends, the coupling agent is added prior to the functionalization reagent, at the same time as the functionalization reagent, or after the functionalization reagent; and the coupling agent comprises at least one of: silicon tetrachloride, methyltrichlorosilane, dimethyldichlorosilane, tin tetrachloride, dibutyltin dichloride, tetraalkoxysilanes, ethylene glycol diglycidyl ether, and 1,2,4-tris(chloromethyl)benzene.

* * * * *